United States Patent Office 3,149,986
Patented Sept. 22, 1964

3,149,986
PROCESS FOR THE MANUFACTURE OF
ARTIFICIAL STONE ARTICLES
Nissan Zelmanoff, 5 Liessin St., Tel Aviv, Israel
No Drawing. Filed Mar. 13, 1961, Ser. No. 95,008
11 Claims. (Cl. 106—119)

This invention relates to the manufacture of artificial stone and building elements of high mechanical strength.

This application is a continuation-in-part of my co-pending application filed August 17, 1954, and identified as Serial No. 450,441, now abandoned.

It is known that a gradual and uncontrolled conversion of hydrated lime into carbonate occurs when lime mortars harden while exposed to the atmosphere. However, the conversion of hydrated lime into carbonate under these circumstances occurs at a very slow rate, and requires months and even years, owing to the very small percentage of carbon dioxide in the atmosphere. Although it has been proposed to accelerate this reaction by exposing the lime mortar, that is, mixtures of hydrated lime and sand or other aggregate, to a gaseous atmosphere or environment which is rich in carbon dioxide, the products obtained by the previously mentioned natural carbonation of lime mortar exposed to the atmosphere, or by the artificially accelerated carbonation have a very low mechanical strength which is far below the accepted standards for structural building elements. It has further been proposed to increase the mechanical strength of the artificially carbonated articles by forming or shaping the latter under very substantial pressures, for example, forming pressures of the order of 600 kilograms per square centimeter, but the necessity of using such high forming pressures increases the complexity and cost of the process and limits the production to articles of relatively small dimensions, thereby excluding the manufacture of building elements, such as, building blocks or bricks of standard dimensions, sheets, tiles, shingles and large structural building elements, such as beams and columns.

Accordingly, it is an object of the invention to provide a process for the manufacture of high strength artificial stone and building elements, such as, building blocks, bricks, sheets, tiles, shingles, and large structural elements like beams and columns, by carbonation of aqueous suspensions of alkaline earth hydroxides, such as, calcium hydroxide and mixed calcium-plus-magnesium hydroxide, without resort to high molding pressures in forming or shaping the suspensions into articles of the desired configurations.

The present invention is based on my discovery that putties of an alkaline earth hydroxide selected from the group consisting of calcium hydroxide and mixed calcium-plus-magnesium hydroxide, will react with carbon dioxide in a gaseous environment so as to form calcium carbonate only when the water content of the hydroxide does not exceed that value, hereinafter referred to as the equilibrium point, at which the water content of the hydroxide is in equilibrium with the moisture in the gases containing the carbon dioxide used for carbonation. The equilibrium point or water content of the lime putty with respect to the surrounding carbon dioxide rich gases is a function of the properties of the particular lime hydrate employed, the relative humidity of the gases and the temperature of the gases. Thus, when a lime putty, either neat or mixed with aggregates, is formed into an article of desired shape and then exposed to carbon dioxide rich gases, the carbon dioxide replaces the combined water of each particle of the lime hydrate to form the carbonate of the latter only when the water content of that particle of the lime hydrate is either equal to, or below the equilibrium point. Assuming that the treating gases are maintained in non-saturated condition and that the water content of the shaped article initially exceeds the equilibrium point for the lime hydrate and temperature and relative humidity of the gases in question, then it is apparent that the shaped article is progressively dried from its outer surface toward the interior thereof and the particles of lime hydrate successively react with the carbon dioxide as the particles reach a water content corresponding to the equilibrium point.

Although carbonation of initially moist lime hydrate exposed to gases rich in carbon dioxide proceeds as the water content of each particle of lime hydrate is reduced to the equilibrium point corresponding to the temperature and relative humidity of the gases being employed, I have found that articles of high mechanical strength can be obtained only if the carbonation of the lime hydrate occurs when the water content thereof is in the range between approximately 0.9 to 10 percent water per lime solids. Further, within the indicated range of water contents capable of producing carbonated articles of high mechanical strength, greater mechanical strengths are obtained when using the relatively higher water contents of such range.

I have also found that the most desirable conditions of carbonation for producing articles of high mechanical strength occur when the temperature and relative humidity of the carbonating gases are selected to correspond to equilibrium points of the lime hydrate lying in the range of approximately 0.9 to 10.0 percent water per lime solids and when the articles initially have a free water content equal to or greater than the upper limit of said range. Under such conditions, all of the lime hydrate is carbonated while having a water content equal to the selected equilibrium point, as the lime hydrate cannot dry below the equilibrium point.

Since the highest mechanical strengths are obtained by carbonation of the lime hydrate while the latter has a water content in the upper portion of the previously identified range thereof, it is apparent that the temperature and humidity of the carbonating gases should be selected so as to correspond to similarly relatively high equilibrium points.

However, the relatively low temperatures and high relative humidities of the gases corresponding to the higher equilibrium points within the indicated range, for example, equilibrium points above 6.0% water content per lime solids, require long periods of time to complete the desired carbonation of the lime hydrate unless the articles are dried prior to carbonation so as to remove a portion of the mixing water from the lime putty or mortar. In the absence of such predrying, it is preferred to operate with carbon dioxide rich gases having temperatures and relative humidities corresponding to equilibrium points of the lime hydrate below 6.0% water content per lime solids.

Further, when carbonating with gases having relatively high temperatures and high relative humidities, for example, temperatures of 155 to 160° F. and relative humidities of 60 to 70%, which correspond to an equilibrium point of the lime hydrate of approximately 3.5, it is also desirable, from the point of view of obtaining a high mechanical strength of the carbonated article, to initially remove a substantial portion of the mixing water from the shaped articles prior to commencement of the carbonation, in order to avoid destruction of the structure due to high water pressures.

I have further found that the desired uniformly high mechanical strength of the carbonated articles cannot be effectively achieved if a major portion of the lime hydrate contained in the shaped article is carbonated while having a water content substantially below the equilibrium point corresponding to the temperature and relative humidity of the treating gases. Thus, if the shaped articles formed from the neat lime putty or the mixture of lime putty and aggregate are predried before the carbonation so as to reduce the time required for completing the carbonation or for increasing the mechanical strength, as mentioned above, the water content of the predried article preferably should not be reduced below the equilibrium point corresponding to the temperature and relative humidity of the carbon dioxide rich gases to be used in effecting the carbonation.

It has also been found that the mechanical strength of the carbonated articles can be increased by reducing the amount of mixing water initially present in the lime putty or mortar from which the articles are formed. Thus, it is preferred, in accordance with the present invention, to employ a mix containing the minimum water content which is necessary for plastic molding or shaping thereof.

Generally, in accordance with this invention, the conditions of the treating gases, that is, the temperature and relative humidity thereof, are initially selected to provide the desired equilibrium point for the lime putty or mortar to be used in forming artificial stone articles or structural building elements. The desired equilibrium point is determined by considering a number of factors including the desired mechanical strength of the articles to be manufactured, the time during which carbonation is to be effected, the availability of gases which are rich in carbon dioxide and have temperatures and relative humidities lying within ranges of acceptable values therefor and the cost and inconvenience involved in substantially altering the temperature and relative humidity of such available gases.

The initial selection of the temperature and humidity of the treating gases can be conveniently performed by forming batches of sample articles of the lime putty or mortar to be used and placing such sample batches successively in a chamber in which the temperature and relative humidity are varied for each batch. The gases in the chamber do not contain carbon dioxide so that carbonation is avoided. The samples of each batch are removed from the chamber after increasing periods of time in the latter, for example, after 8, 16, 24, 32, 40, 48, 56 and 64 hours, and the water content of each sample is measured. The equilibrium point for the temperature and relative humidity employed with each batch is that value at which the water content is stabilized, that is, neither increases nor decreases upon further exposure to such temperature and relative humidity.

Several of the equilibrium points for dolomitic lime hydrate in a gaseous environment having different combinations of temperature and relative humidity are given, by way of example, in the table that follows:

TABLE 1

| Temperature, °F. | Relative humidity, percent | Equilibrium point, percent $H_2O$ based on lime solids |
|---|---|---|
| 195 | 2 | 0.6 |
| 185 | 6 | 0.7 |
| 185 | 10 | 0.9 |
| 185 | 30 | 1.0 |
| 170 | 15 | 1.1 |
| 160 | 15 | 1.2 |
| 175 | 40 | 1.3 |
| 155 | 25 | 1.5 |
| 150 | 40 | 2.0 |
| 160 | 60 | 3.5 |
| 130 | 15 | 3.5 |
| 155 | 70 | 4.0 |
| 120 | 25 | 4.0 |
| 110 | 25 | 5.5 |
| 140 | 50 | 6.0 |
| 130 | 30 | 6.0 |
| 140 | 70 | 6.4 |
| 130 | 45 | 7.0 |
| 100 | 40 | 7.5 |
| 100 | 70 | 8.5 |
| 150 | 90 | 14.3 |
| 100 | 80 | 16.8 |
| 108 | 99 | 30.0 |
| 100 | 99 | 33.0 |

Several of the equilibrium points for high calcium lime hydrate in a gaseous environment having different combinations of temperature and relative humidity are given, by way of example, in the table that follows:

TABLE 2

| Temperature, °F. | Relative humidity, percent | Equilibrium point, percent $H_2O$ based on lime solids |
|---|---|---|
| 160 | 6 | 0.48 |
| 185 | 60 | 0.7 |
| 195 | 70 | 1.0 |
| 107 | 70 | 1.8 |
| 110 | 90 | 3.0 |
| 99 | 93 | 4.8 |

In accordance with this invention, the shaped articles of lime putty or mortar may be carbonated by exposure to gases having a temperature in the range between approximately 35° F. and 200° F. and a relative humidity in the range between approximately 10% and 99.9%, so long as the temperature and relative humidity are selected to provide the desired equilibrium point, as mentioned above. Further, such gases should have a content of carbon dioxide in the range between 10% and 100%, and may consist of air to which carbon dioxide is added, products of combustion, such as, the flue gas of a lime kiln, any gas rich in carbon dioxide which is derived from a chemical plant, or the product of fermentation, as in a brewery, and having a carbon dioxide content within the required range. An inadequate carbon dioxide content will excessively prolong the time required for carbonation of the lime hydrate.

The process embodying the invention will now be illustrated by reference to the following specific examples thereof.

*Example 1*

Artificial stone articles were formed by carbonating a lime mortar or mix containing dolomitic lime hydrate and crushed dolomitic limestone.

The dolomitic lime hydrate was of the following description:

(a) Chemical composition: Percent by weight
  $Ca(OH)_2$ ---------------------------------- 53.3
  $Mg(OH)_2$ ---------------------------------- 41.8
  $SiO_2$ -------------------------------------- 1.2
  $Fe_2O_3$ ------------------------------------ 0.5
  $Al_2O_3$ ------------------------------------ 0.2
  $MgCO_3$—$CaCO_3$ ---------------------------- 1.5
  $H_2O$ --------------------------------------- 1.5

(b) Sieve analysis: 95% passing through 200 mesh sieve.

The crushed dolomitic limestone used as the aggregate had the following sieve analysis:

Passing a 20 mesh sieve ------------- 100%.
Passing a 100 mesh sieve ------------ 5% maximum.

The lime mortar was formed by mixing together 1 part, by weight, of the dolomitic lime hydrate and 3 parts, by weight, of the crushed dolomitic limestone, with 0.4 part, by weight, of water (9.1% of total mix).

The resulting plastic mass was cast, or otherwise formed without substantial molding pressure, into articles of the desired configuration, for example, 1 inch thick tension testing briquettes.

Carbonation of the briquettes was effected by placing the same in a chamber through which a current of gas, specifically the flue gas of a lime kiln containing 23% carbon dioxide was made to pass. The temperature and relative humidity of the gas current were controlled so as to maintain a temperature of 130° F. and a relative humidity of 50% within the chamber, that is, in the gaseous environment to which the shaped articles or briquettes were exposed during carbonation. As will be apparent from Table 1, the above values of temperature and relative humidity corresponded to an equilibrium point for the dolomitic lime hydrate of approximately 7.0% water based on the lime solids, that is, in a gaseous atmosphere or environment having a temperature of 130° F. and a relative humidity of 50%, the lime hydrate will be in equilibrium with the gaseous atmosphere or environment when it retains 7.0% water.

It was found that, after 32 hours of exposure to the described gaseous environment, the carbon dioxide in the latter had carbonated approximately 92% of the available hydroxide and the carbonated articles had a tensile strength of 500 p.s.i.

After 48 hours in the carbon dioxide containing gaseous environment, it was found that 95% of the available hydroxide was carbonated, and that the articles thus treated had attained a maximum tensile strength of 600 p.s.i., and the water content thereof had been reduced and stabilized substantially at the equilibrium point, that is, 7% based on the lime solids, thereby indicating complete carbonation of the available hydroxide.

*Example 2*

Articles formed from a lime mortar or mix prepared as indicated in Example 1, were exposed to a gaseous environment containing 23% carbon dioxide and which was maintained at a temperature between 185° F. and 195° F. and at a relative humidity between 2% and 6%. As is apparent from Table 1, such conditions correspond to an equilibrium point of 0.6 to 0.7% water based on lime solids.

After 48 hours in such gaseous environment, the articles had a tensile strength of only 30 p.s.i., and only 10% of the available hydroxide was carbonated, thereby indicating the necessity of operating with conditions of temperature and relative humidity corresponding to equilibrium points above 0.6 or 0.7.

*Example 3*

Articles formed from a lime mortar or mix prepared as indicated in Example 1 were exposed to a gaseous environment containing 23% carbon dioxide and which was maintained at a temperature of approximately 185° F. and a relative humidity of approximately 10%. As is apparent in Table 1, such conditions of temperature and relative humidity correspond to an equilibrium point of 0.9% water based on lime solids. After 48 hours in such gaseous environment, the articles attained a tensile strength of 240 p.s.i.

*Example 4*

Articles formed from a lime mortar or mix prepared as indicated in Example 1 were exposed to a gaseous environment containing 23% carbon dioxide and which was maintained at a temperature of 160° F. and a relative humidity of 60% corresponding to an equilibrium point of 3.5% water based on lime solids, as is apparent from Table 1. After 48 hours in such gaseous atmosphere, the carbonated articles had a tensile strength of 420 p.s.i.

*Example 5*

Articles formed from a lime mortar or mix prepared as indicated in Example 1 were exposed to a gaseous environment containing 23% carbon dioxide and which was maintained at a temperature of 108° F. and a relative humidity of 99% corresponding to an equilibrium point of 30% water based on lime solids, as is apparent from Table 1. After 48 hours in such gaseous environment, the articles attained a tensile strength of only 60 p.s.i., and a maximum tensile strength of 180 p.s.i. was attained only after exposure of the articles to the carbonating gaseous environment or atmosphere for a period of 168 hours.

From Examples 1 to 5, inclusive, it will be apparent that, within the range of carbonating conditions of temperature and relative humidity corresponding to equilibrium points between approximately 0.9% and 10.0%, there is an increase in tensile strength with increasing equilibrium points. However, there is a substantial decrease in the tensile strength of the article when the conditions of temperature and relative humidity correspond to an equilibrium point which is either substantially below or substantially above the indicated usable range, as in Examples 2 and 5, respectively. In both Examples 2 and 5, all of the lime hydrate has not been carbonated, although for different reasons. In Example 2, the mix has been dried to the condition of equilibrium with the gaseous environment, but with such a low water content the reaction of carbonation proceeds very slowly. In Example 5, the very high moisture content of the gaseous environment results in very poor drying properties so that the particles of lime hydrate only very slowly reach the equilibrium point at which carbonation can occur.

*Example 6*

1 part, by weight, of the dolomitic lime hydrate and 3 parts, by weight, of the crushed limestone aggregate described in Example 1 were mixed together with 0.4 part, by weight, of water to form a mix in which water constituted 9.1% of the total weight. Articles cast from this mix were exposed to a gaseous environment containing 14% carbon dioxide and which was maintained at a temperature of 140° F. and a relative humidity of 66% corresponding approximately to an equilibrium point of 6.4% water based on lime solids.

The articles attained a tensile strength of 420 p.s.i. after 48 hours' exposure to such gaseous environment and a maximum tensile strength of 500 p.s.i. after 112 hours of carbonation.

When compared with Example 1, it will be seen that a longer period (112 hours as against 48 hours) was required to substantially complete carbonation of the available hydroxide by reason of the lower carbon dioxide content of the treating gases.

*Example 7*

A mix was prepared as in Example 6, with the exception that it contained 0.45 part, by weight, of water, whereby the water content of the mix was increased from 9.1% to 10.1% of the total. By reason of this increase in the initial water content of the mix, articles formed from the latter and exposed to the same carbonating gaseous environment as described in Example 6 attained a tensile strength of 300 p.s.i. after 48 hours and a maximum tensile strength of 420 p.s.i. after 112 hours of carbonation.

Thus, a comparison of Examples 6 and 7 shows that an increase in the amount of mixing water causes a reduction in the mechanical strength of the carbonated articles, particularly when carbonation is effected under conditions of temperature and relative humidity corresponding to relatively high equilibrium points within the indicated useful range. Accordingly, the amount of mixing water in the initial lime putty or mortar should be held at the minimum necessary for creating a plastic mass which can be cast or otherwise shaped with little or no pressure and which will retain its shape upon removal from the mold prior to carbonation.

*Example 8*

A lime mortar was prepared from dolomitic lime hydrate, crushed dolomitic limestone and water, as in Example 1, and therefore contained 9.1% water. This mix was cast into articles of the desired shape and then dried prior to the commencement of carbonation down to a water content of 4.5% of the total weight of the article, which corresponds to about 18% based on the weight of lime solids. Such predried articles were then exposed to a gaseous environment as described in Example 4, that is, containing 23% carbon dioxide and maintained at a temperature of 160° F. and a relative humidity of 60%, which correspond to an equilibrium point of 3.5%. After 48 hours' exposure to such gaseous environment, the carbonated articles attained a tensile strength of 500 p.s.i., as compared with the tensile strength of 420 p.s.i. attained by the articles in Example 4 which were carbonated as cast, that is, with an initial water content of 9.1%.

From a comparison of Examples 4 and 8, it is apparent that, when carbonating in a gaseous environment having relatively high values of temperature and relative humidity, the mechanical strength of the carbonated articles is increased by removing a portion of the mixing water from the shaped articles prior to the carbonation thereof. However, care should be exercised that, in thus removing a portion of the mixing water, the water content of the articles, based on the lime solids therein, does not fall appreciably below the equilibrium point corresponding to the temperature and relative humidity of the carbon dioxide containing gases in which carbonation is effected.

*Example 9*

Articles cast from the mix described in Example 1 were carbonated by exposure to a gaseous environment containing 26% carbon dioxide and maintained at a temperature of 130° F. and a relative humidity of 50%, which conditions correspond to an equilibrium point for the lime hydrate of approximately 7.0% water based on the lime solids.

(a) When the articles were carbonated as cast, that is, with a water content of 9.1% based on the total mix, or a water to lime ratio of .40, the maximum tensile strength of 580 p.s.i. was obtained after 72 hours in the described carbonating atmosphere.

(b) When the articles were predried before carbonation to remove part of the mixing water and thereby reduce the water content to 6% % of the total weight of the article, that is, 25.5% based on the lime solids, the maximum tensile strength of 640 p.s.i. was obtained after 72 hours in the described carbonating atmosphere.

(c) However, when the articles were predried before carbonation to reduce the water content to approximately 1% of the total weight of the article, that is, 4% based on the lime solids, which water content was substantially below the equilibrium point for the lime hydrate, and a maximum tensile strength of only 200 p.s.i. was attained by such predried articles after 72 hours' exposure to the described carbonating environment. Thus, predrying below the equilibrium point very substantially reduces the mechanical strength of the carbonated articles, and this results from the fact that a substantial portion of the available hydroxide is carbonated while having a water content below the equilibrium point.

Where it is desirable to obtain an artificial stone or structural building element of uniform mechanical strength throughout, the temperature and relative humidity are maintained substantially constant during carbonation, so that carbonation of all of the available hydroxide proceeds at the same equilibrium point. However, in some instances, a very high mechanical strength or hardness may only be required in the outer portions of an artificial stone article produced in accordance with this invention, while the core or inner portion thereof is relatively softer, for example, as in a floor tile. Since the desired high mechanical strength is achieved by carbonating under conditions of temperature and relative humidity corresponding to high equilibrium points, and since carbonation of the article proceeds from the outer surface toward the interior thereof, it is possible to vary the mechanical strength of the article, as between its outer and inner portions, by sequentially changing the temperature and humidity conditions, as in the following example:

*Example 10*

The mix described in Example 1 was cast into articles in the form of 1 inch thick tiles. The tiles were carbonated by exposure to a gaseous environment containing 25% carbon dioxide for a period of 48 hours. During the first 10 hours of carbonation, the gaseous environment was maintained at a temperature of 100° F. and a relative humidity of 70%, corresponding to an equilibrium point of 8.5%, and, thereafter, the gaseous environment was maintained at a temperature of 150° F. and a relative humidity of 40%, corresponding to an equilibrium point of 2.0%. Upon the carbonation of substantially all of the available hydroxide, that is, after 48 hours, it was found that the tile had a compressive strength of approximately 7500 p.s.i. in the outer portion thereof having a depth of approximately 0.1 inch, while the interior portion of the tile had a compressive strength of 200 p.s.i.

If, for any reason, such as, the availability of carbon dioxide containing gases at relatively low temperatures and high relative humidities, it is desired to effect carbonation of the shaped articles under conditions corresponding to equilibrium points far above the upper limit of the preferred range thereof, carbonated articles of substantial mechanical strength may still be obtained by predrying the articles to a water content within that preferred range, for example, to a water content below 6.0% based on the lime solids, which is substantially below the water content corresponding to the equilibrium point determined by the temperature and relative humidity of the carbonating gases, as in the following example:

*Example 11*

Articles were cast from the mix described in Example 1 and were predried to a water content of 1% of the total weight of the article prior to carbonation by exposure to a gaseous environment having the same conditions as specified in Example 5, that is, a temperature of 108° F., a relative humidity of 99%, and a carbon dioxide content of 23%. Since the water content at the beginning of carbonation was reduced to 4% based on the lime solids, which was very substantially below the equilibrium point of 30% corresponding to the stated temperature and relative humidity, the lime hydrate absorbed moisture during its exposure to the carbonating gases, but a major portion of the carbonation occurred with the lime hydrate having a water content much below the equilibrium point, that is, in the preferred range of water contents, thereby to provide a carbonated article of substantial mechanical strength. More specifically, the articles attained a tensile strength of 420 p.s.i. after 96 hours exposure to the carbonating gases. However, a comparison with Example 1 will show that the preferred carbonating conditions, that is, temperature and relative humidity values corresponding to equilibrium points in the upper portion of the indicated range yield higher mechanical strengths.

Although the above examples have all produced artificial stone articles or structural building elements from a lime mortar or mix containing dolomitic lime hydrate, that is, mixed calcium-plus-magnesium hydroxide, and crushed dolomitic limestone, as the aggregate, it is to be understood that high calcium lime hydrate and other aggregates can be employed.

*Example 12*

Artificial stone articles were formed by carbonating a lime mortar or mix containing high calcium lime hydrate and crushed dolomitic limestone.

The high calcium lime hydrate was of the following description:

(a) Chemical composition:

| | |
|---|---|
| CaO | percent by weight__ 73.7 |
| MgO | do____ 0.25 |
| $SiO_2$ | do____ 0.5 |
| $Fe_2O_3$ | do____ 0.1 |
| $Al_2O_3$ | do____ 0.5 |
| Water of hydration | do____ 23.6 |

(b) Sieve analysis:
  Passing a 50 mesh sieve _____percent__ 100
  Passing a 100 mesh sieve _____do____ 96
  Passing a 200 mesh sieve _____do____ 90
(c) Water retention value _____ 89

The crushed dolomitic limestone was as described in Example 1.

The lime mortar was formed by mixing together 1 part, by weight, of the high calcium lime hydrate, and 3 parts, by weight, of the crushed dolomitic limestone, with 0.4 part, by weight, of water constituting 9.1% of the total weight of the mix.

The resulting plastic mass was cast into articles of desired shape, which were then predried to a water content of 5.6%, based on the total weight of the article.

Carbonation of the articles was effected by exposing the latter to a gaseous environment which, as in the preceding examples, can be air enriched with carbon dioxide, but which, in this example was the flue gas of a lime kiln containing 18% carbon dioxide. The gaseous environment was maintained at a temperature of 99° F. and a relative humidity of 93% corresponding to an equilibrium point of 4.8% water based on the lime solids, as is apparent from Table 2.

Upon removal from the gaseous carbonating environment after 48 hours, the articles were found to possess a tensile strength of 660 p.s.i.

*Example 13*

A lime mortar was formed by mixing 1 part, by weight, of the high calcium lime hydrate described in Example 12 with 3 parts, by weight, of a quartz sand, and with .35 part, by weight, of water. Articles were cast from such lime mortar and then exposed to a gaseous environment containing 18% carbon dioxide and maintained at a temperature of 152° F. and a relative humidity of 90% which correspond to an equilibrium point for the high calcium lime hydrate of approximately 1.7% water based on the lime solids.

After 24 hours' exposure to such gaseous environment, the carbonated articles had attained a tensile strength of 310 p.s.i.

*Example 14*

A lime mortar was prepared by mixing 1 part, by weight, of the dolomitic lime hydrate described in Example 1 with 3 parts, by weight, of quartz sand and .35 part, by weight, of water. Articles cast from this lime mortar were then exposed to carbonation in a gaseous environment containing 17% carbon dioxide and maintained at a temperature of 150° F. and a relative humidity of 40%. The stated conditions of temperature and relative humidity corresponding to an equilibrium point of 2.0% water based on the lime solids for the dolomitic lime hydrate.

After being exposed to the stated gaseous environment for 16 hours, the carbonated articles attained a tensile strength of 150 p.s.i.

*Example 15*

A lime mortar was prepared by mixing 1 part, by weight, of the dolomitic lime hydrate, as described in Example 1, with 10 parts, by weight, of Lelite, which is an expanded slag available commercially from The Warner Company, Philadelphia, Pennsylvania, and with 1.5 parts of water (12% of the total mix). Articles were cast from this lime mortar and then exposed to a gaseous environment containing 20% carbon dioxide and being maintained at a temperature of 127° F. and a relative humidity of 45%, which conditions correspond to an equilibrium point of 7% water content based on the lime solids.

After being exposed to the described gaseous environment for a period of 21 hours, the carbonated articles had attained a tensile strength of 210 p.s.i.

*Example 16*

Carbonated articles were prepared in the manner described in Example 15, with the exception that the initial lime mortar contained 1 part, by weight, of the dolomitic lime hydrate and 13.5 parts, by weight, of the expanded slag aggregate. Such articles attained a maximum tensile strength of 220 p.s.i. after being exposed to the gaseous carbonating environment for a period of 18 hours.

*Example 17*

Carbonated articles were prepared in the manner described in Example 15 with the exception that the initial lime mortar contained 1 part, by weight, of the dolomitic lime hydrate and 5 parts, by weight, of the expanded slag aggregate. The carbonated articles attained a tensile strength of 240 p.s.i. after being exposed to the gaseous carbonating atmosphere for a period of 17 hours.

*Example 18*

A mix was prepared from 4 parts, by weight, of the dolomitic lime hydrate described in Example 1, 1 part, by weight, of dry fine sawdust, and 2 parts, by weight, of water. In preparing the mix, the water was initially mixed with ½ of the dolomitic lime hydrate to form a slurry to which the sawdust was then added followed by the balance of the lime hydrate. After 10 minutes of mixing, a homogenous plastic mass was obtained. Articles were cast from this plastic mass and exposed to a gaseous environment containing 18% carbon dioxide and maintained at a temperature of 128° F. and a relative humidity of 45% corresponding to an equilibrium point for the lime hydrate of 7% based on the lime solids. After 43 hours in the described gaseous carbonating environment, the carbonated articles attained a tensile strength of 400 p.s.i. and had a density of 19.5 grams per cubic inch.

*Example 19*

2 parts, by weight, of the dolomitic lime hydrate described in Example 1, 1 part, by weight, of newsprint which was torn into shreds, soaked, beaten to form a pulp, and then squeezed to remove the water therefrom, and 4 parts, by weight, of water, were mixed together to form a lime mortar from which articles were cast. The cast articles were exposed to a gaseous environment containing 18% carbon dioxide and maintained at a temperature of 128° F. and a relative humidity of 44%, which conditions correspond to an equilibrium point of approximately 7% water content based on the lime solids. After 48 hours in the gaseous carbonating environment, the carbonated articles had a tensile strength of 300 p.s.i. and a compressive strength of 1000 p.s.i. The carbonated articles were capable of being sawed and nailed, and had a density of 12.9 grams per cubic centimeter.

*Example 20*

A lime mortar was prepared by mixing together 1 part, by weight, of the dolomitic lime hydrate described in Example 1, 3 parts, by weight, of a very finely crushed dolomitic limestone of which 99.5% passes through a 200 mesh sieve and 97% passes through a 325 mesh sieve, and .6 part, by weight, of water. Articles were cast from the described mix and predried so as to contain 6% water based on the total weight of the article prior to being exposed in a gaseous environment containing 20% carbon dioxide and maintained at a temperature of 130° F. and a relative humidity of 65%, which conditions correspond to an equilibrium point of approximately 8% water content based on the lime solids.

After being exposed to the gaseous carbonating environment for 40 hours, the carbonated articles attained a tensile strength of 560 p.s.i.

Although the foregoing examples have all employed an aggregate in the lime mortar from which the carbonated articles are formed, it is to be noted that aggregates other than those specifically included in the examples may be employed, such as, asbestos, marble chips and straw, and further that, in accordance with the present invention, carbonated articles having substantial mechanical strength may be formed from a neat lime putty, as in the following example:

*Example 21*

A neat lime putty was produced by mixing 1 part, by weight, of the dolomitic lime hydrate described in Example 1 with .4 part, by weight, of water. Articles cast from the neat lime putty were exposed to a gaseous environment containing 20% carbon dioxide and maintained at a temperature of 130° F. and a relative humidity of 70%, which conditions correspond to an equilibrium point of approximately 8% water content based on the lime solids.

After 72 hours in the described gaseous carbonating environment, the carbonated articles attained a maximum tensile strength of 300 p.s.i.

Although the foregoing examples have effected carbonation with gases containing approximately 17 to 26% carbon dioxide, it is to be noted that the treating gases can contain smaller and very substantially larger quantities of carbon dioxide, as in the examples that follow:

*Example 22*

Articles were cast from a lime mortar as described in Example 1 and then exposed to a gaseous environment containing 10% carbon dioxide and maintained at a temperature of 125° F. and a relative humidity of 35%, which conditions correspond to an equilibrium point of approximately 7% water content based on the lime solids. The carbonated articles attained a maximum tensile strength of 560 p.s.i. after 112 hours' exposure to the described gaseous carbonating environment.

*Example 23*

Cast articles identical to those described in Example 22 were exposed to a gaseous environment containing 95% carbon dioxide and maintained at a temperature of 125° F. and a relative humidity of 35%, that is, the same conditions as in Example 22 with the exception of the change in carbon dioxide content of the gases. The carbonated articles attained their maximum tensile strength of 550 p.s.i. after only 48 hours exposure to the gaseous carbonating atmosphere. Thus, the increase in carbon dioxide content of the carbonating gases merely increases the rate at which the hydroxide is carbonated, but does not affect the maximum strength that can be attained.

It will be appreciated from the foregoing examples that various products of a wide range of composition can be produced by utilizing the novel concept of the invention. Such products may be produced by mixing one part by weight of lime hydrate (that is calcium hydroxide alone or mixtures of calcium and magnesium hydroxide such as dolomitic hydroxide) with about 0.25 to 13.5 parts by weight of an aggregate and sufficient water to form a plastic moldable mass, such as water in the range of about 0.35 to 1.5 parts by weight. The mass is then shaped into the desired article which is treated in a gaseous atmosphere containing at least about 10% $CO_2$ and moisture in non-saturating amounts corresponding to a relative humidity within the range of about 10% to 99.9% at a temperature falling within the range of about 35° F. to 200° F., the carbonation treatment being carried out when the moisture in the gaseous atmosphere is substantially in equilibrium with the water in the hydrate for water contents in the lime hydrate ranging between about 0.9% to 10%. In one preferred aspect, the water content of the hydrate during carbonation under equilibrium conditions may be in the upper range of about 6% to 10%, and in another preferred aspect may be in the lower range of about 1 to 6%.

Although illustrative examples of the process embodying this invention have been described in detail herein, it is to be understood that the invention is not limited to those precise examples, and that various changes and modifications can be effected therein by one skilled in this art without departing from the scope or spirit of the invention, except as defined in the appended claims.

What is claimed is:

1. A process for the manufacture of artificial stone articles of high mechanical strength which comprises, providing an alkaline earth hydroxide selected from the group consisting of calcium hydroxide and a mixture of calcium and magnesium hydroxide containing sufficient water to form a plastic mass, forming said mass into an article of the desired configuration, subjecting said article to carbonation by reacting it with a gaseous atmosphere containing at least about 10% carbon dioxide and moisture in non-saturating amounts corresponding to a relative humidity falling within the range of about 10% to 99.9% at a temperature ranging from about 35° F. to 200° F. to maintain the water content of the hydroxide in the range of about 0.9 to 10% based on the hydroxide content and substantially in equilibrium with the moisture in the gaseous atmosphere.

2. The process of claim 1, wherein the equilibrium conditions as between the water in the hydroxide and the moisture in the gaseous atmosphere are sequentially changed to maintain the article at different water contents of the hydroxide within the range of 0.9 to 10% during the carbonation thereof, whereby the resulting carbonated article has different strength properties at different portions thereof.

3. A process for manufacturing artificial stone articles which comprises, providing an aqueous suspension of an alkaline earth hydroxide selected from the group consisting of calcium hydroxide and a mixture of calcium and magnesium hydroxide, concentrating said suspension into the shape of an article of desired configuration, continually exposing the shaped article to a gaseous atmosphere containing at least about 10% carbon dioxide and moisture in non-saturating amounts corresponding to a relative humidity within the range of about 10% to 99.9% at a temperature ranging from about 35° F. to 200° F. until equilibrium has been substantially achieved between the moisture in the atmosphere and the water in the hydroxide in the range of about 0.9 to 10% based on the hydroxide content, continuing said exposure to effect carbonation of said hydroxide, and withdrawing said article from said atmosphere upon substantial completion of said carbonation.

4. A process for the manufacture of artificial stone articles of high mechanical strength which comprises, providing a plastic mass comprising a mixture of about one part by weight of lime hydrate, about 0.25 to 13.5 parts by weight of an aggregate and substantially the balance water in an amount sufficient to form said plastic mass, shaping said mass into an article of desired configuration, continually exposing the shaped article to a gaseous atmosphere containing at least about 10% carbon dioxide and moisture in non-saturating amounts corresponding to a relative humidity within the range of about 10% to 99.9% at a temperature ranging from about 35° F. to 200° F. until equilibrium has been achieved between the moisture in the gaseous atmosphere and the water in the lime hydrate in the range of about 0.9 to 10%, continuing said exposure to effect carbonation of said hydrate, and withdrawing said article from said atmosphere upon substantial completion of said carbonation.

5. The process of claim 4, wherein said aggregate is crushed dolomitic limestone.

6. The process of claim 4, wherein said aggregate is quartz sand.

7. The process of claim 4, wherein said aggregate is sawdust.

8. The process of claim 4, wherein said aggregate is paper pulp.

9. A process for the manufacture of artificial stone articles of high mechanical strength which comprises, providing a plastic mass comprising a mixture of about one part by weight of lime hydrate about 0.25 to 13.5 parts by weight of an aggregate and about 0.35 to 1.5 parts by weight of water, shaping said mass into an article of desired configuration, continually exposing the shaped articles to an atmosphere containing at least 10% carbon dioxide and moisture in non-saturating amounts corresponding to a relative humidity within the range of about 10% to 99.9% at a temperature ranging from about 35° F. to 200° F. until equilibrium has been achieved between the moisture in the gaseous atmosphere and the water in the lime hydrate in the range of about 0.9 to 10%, continuing said exposure to effect carbonation of said hydrate, and withdrawing said article from said atmosphere upon substantial completion of said carbonation.

10. The method of claim 9, wherein the temperature and humidity of gaseous atmosphere are such that the moisture of the atmosphere is in equilibrium with the water in the lime hydrate having a water content of about 6% to 10% by weight based on the lime solids.

11. The method of claim 9, wherein the temperature and humidity of the gaseous atmosphere are such that the moisture of the atmosphere is in equilibrium with the water in the lime hydrate having a water content of about 1% to 6% by weight based on the lime solids.

References Cited in the file of this patent

UNITED STATES PATENTS

| | | |
|---|---|---|
| 393,002 | Flegle | Nov. 20, 1888 |
| 1,907,369 | Schless | May 2, 1933 |
| 2,013,811 | Smith | Sept. 10, 1935 |
| 2,016,986 | Case | Oct. 8, 1935 |
| 2,423,335 | Minnick | July 1, 1947 |
| 2,471,875 | Kester | May 31, 1949 |

FOREIGN PATENTS

| | | |
|---|---|---|
| 7,327 | Australia | Dec. 12, 1932 |